(12) United States Patent
Sarnoff et al.

(10) Patent No.: US 9,442,627 B2
(45) Date of Patent: Sep. 13, 2016

(54) EXPANDABLE TWO-DIMENSIONAL FLOW FOR CONTAINER HIERARCHY

(71) Applicant: Evernote Corporation, Redwood City, CA (US)

(72) Inventors: Matthew Jacob Sarnoff, San Francisco, CA (US); Jack Hirsch, San Francisco, CA (US); Gabriel Campodonico, Oakland, CA (US); Phil Constantinou, San Francisco, CA (US)

(73) Assignee: Evernote Corporation, Redwood City, CA (US)

( * ) Notice: Subject to any disclaimer, the term of this patent is extended or adjusted under 35 U.S.C. 154(b) by 212 days.

(21) Appl. No.: 14/264,226

(22) Filed: Apr. 29, 2014

(65) Prior Publication Data

US 2014/0380232 A1 Dec. 25, 2014

Related U.S. Application Data

(60) Provisional application No. 61/838,595, filed on Jun. 24, 2013.

(51) Int. Cl.
| | |
|---|---|
| *G06F 3/048* | (2013.01) |
| *G06F 3/0481* | (2013.01) |
| *G06F 3/0482* | (2013.01) |
| *G06F 3/0484* | (2013.01) |
| *G06F 17/22* | (2006.01) |
| *G06F 17/30* | (2006.01) |

(52) U.S. Cl.
CPC ......... *G06F 3/04817* (2013.01); *G06F 3/0482* (2013.01); *G06F 3/04847* (2013.01); *G06F 17/2247* (2013.01); *G06F 17/30625* (2013.01)

(58) Field of Classification Search
CPC ....................... G06F 17/2247; G06F 17/30625
See application file for complete search history.

(56) References Cited

U.S. PATENT DOCUMENTS

| | | | |
|---|---|---|---|
| 5,546,526 A | 8/1996 | Li et al. | |
| 5,675,755 A * | 10/1997 | Trueblood | G06F 3/0481 715/791 |
| 6,496,206 B1 | 12/2002 | Mernyk et al. | |
| 6,857,105 B1 * | 2/2005 | Fox | G06F 3/0482 715/808 |
| 7,437,676 B1 * | 10/2008 | Magdum | H04L 41/024 715/735 |
| 7,669,147 B1 * | 2/2010 | Molander | G06F 3/0482 707/693 |
| 7,873,916 B1 * | 1/2011 | Chaudhri | G06F 3/04817 715/765 |
| 8,386,934 B2 * | 2/2013 | Takakura | G06F 17/30064 715/723 |
| 8,977,963 B1 * | 3/2015 | Joyce | G11B 27/00 715/716 |

(Continued)

FOREIGN PATENT DOCUMENTS

GB 2491487 A 12/2012

*Primary Examiner* — Ryan Pitaro
(74) *Attorney, Agent, or Firm* — Muirhead and Saturnelli, LLC (57) ABSTRACT

Presenting items in a two-dimensional access pane includes presenting a first set of icons arranged contiguously and in two dimensions of the access pane, where each of the icons corresponds to an item and at least some of the items are container icons that represent containers that contain other items and expanding at least one of the container icons to show a first container pane having icons corresponding to items contained in a corresponding container, where icons in the first container pane are arranged contiguously and in two dimensions of the first container pane. At least some of the icons in the first container pane may be container icons that represent containers that contain other items. The items may be files in a file system provided in connection with a personal computer that runs Macintosh OS, MS Windows, and Linux. The items may be data in a database system.

26 Claims, 6 Drawing Sheets

(56) References Cited

U.S. PATENT DOCUMENTS

| | | | |
|---|---|---|---|
| 2005/0132304 A1* | 6/2005 | Guido | G06F 17/30994 715/853 |
| 2005/0192924 A1* | 9/2005 | Drucker | G06F 3/0483 |
| 2006/0161868 A1* | 7/2006 | Van Dok | G06F 3/0481 715/835 |
| 2008/0307361 A1* | 12/2008 | Louch | G06F 3/0481 715/835 |
| 2009/0058821 A1 | 3/2009 | Chaudhri et al. | |
| 2009/0282364 A1* | 11/2009 | White | G06F 17/24 715/804 |
| 2010/0058244 A1* | 3/2010 | Wang | G06F 3/04817 715/838 |
| 2010/0180230 A1* | 7/2010 | Bogner | G06F 3/0481 715/810 |
| 2011/0252346 A1 | 10/2011 | Chaudhri | |
| 2011/0265040 A1 | 10/2011 | Shin et al. | |
| 2012/0124520 A1* | 5/2012 | Samp | G06F 3/04886 715/834 |
| 2013/0007671 A1* | 1/2013 | Hammontree | G06F 17/30716 715/853 |
| 2013/0263057 A1* | 10/2013 | Ubillos | G06F 3/0483 715/838 |
| 2014/0082554 A1* | 3/2014 | Iwaniszczuk | G06F 3/0483 715/823 |
| 2014/0181708 A1* | 6/2014 | Kikin-Gil | G06F 3/0482 715/765 |
| 2014/0250390 A1* | 9/2014 | Holmes | G06F 9/4443 715/760 |
| 2014/0282165 A1* | 9/2014 | Tu | G06F 3/04817 715/769 |
| 2014/0380232 A1* | 12/2014 | Sarnoff | G06F 3/04817 715/781 |

* cited by examiner

EXPANDABLE TWO-DIMENSIONAL FLOW FOR CONTAINER HIERARCHY

CROSS-REFERENCE TO RELATED APPLICATIONS

This application claims priority to U.S. Prov. App. No. 61/838,595, filed Jun. 24, 2013, and entitled "EXPANDABLE TWO-DIMENSIONAL FLOW FOR CONTAINER HIERARCHY," which is incorporated herein by reference.

TECHNICAL FIELD

This application is directed to the field of organization and presentation of information, and more particularly to the field of building and displaying a two-dimensional flow of hierarchic data structures on a computer screen.

BACKGROUND OF THE INVENTION

Billions of users are viewing high resolution screens of their mobile devices and personal computers (desktops and laptops) on a daily basis. Increasing information capacity of contemporary displays has become a mainstream lifestyle factor; it causes widespread changes in the ways people view and process information and has broad implications for the design of user interfaces by software and hardware vendors.

A two-dimensional user interface, where information snippets are arranged into a two-dimensional array on a pane, a page or a desktop, has become a ubiquitous key to productivity for popular operating systems. Snippets may include document thumbnails and icons, file and application icons, action buttons and other visual objects. With the advancement of graphical quality of such visualization, this usage and information access metaphor becomes increasingly intuitive and representative of the data and software accessed by a user.

Growing streams of diversified business and personal information bring to life powerful memorizing tools and services such as the Evernote Service and software developed by the Evernote Corporation of Redwood City, Calif. There are also cloud based file exchange services, including Dropbox, Box.net, Google Drive, Apple iCloud, Amazon S3, and many other products and solutions. Combinations of local, device centric and cloud based storage greatly increase information capacities available to individuals and organizations. Once such information volumes reach a certain critical mass, additional data structuring and organization may be required to facilitate comprehension and processing.

Among numerous types of data organization, two popular logical methods are a container approach and a tagging approach. Under the container approach, a hierarchy of containers (also known as folders, directories, binders, portfolios, etc.) is designed to uniquely keep each item (information unit, such as a file, document, image, etc.) in a smallest container within a set of containers, partially ordered by inclusion of the containers. An ordered subset of container names, starting with a largest container that is not a sub-container of another container, where each subsequent container is included into a previous one and where the last of the containers contains the desired item, is known as a full path to the item. A tag approach (tags may be synonymously called labels, identifiers, tabs, codes, marks, etc.) does not require a unique categorization of information units and may not represent a hierarchy, such as in the case of plain tags. Container and tag based organization methods may be combined in some software applications, for example, in the Evernote data organization, or in certain database, search and email systems. Each of the methods provides a distinct way of visualization.

Simple and intuitive visualization methods for container hierarchies, such as folder trees in file systems, notes and notebooks in content management systems and other hierarchical data in various applications, represent important components of seamless information access. One prominent visual metaphor adopted in diverse operating systems and software applications may represent a container hierarchy as a two-pane viewer: the first pane may be a one-dimensional list of containers and another pane may be an adjacent one or two-dimensional viewing pane (a gallery). Sometimes, the container hierarchy list may have a vertical line-by-line item arrangement where different container levels are indicated by offsets of names of the containers. Containers that include other containers may be marked, for example, by triangles preceding names of the containers. Some or all containers may be partially or fully expanded in a hierarchy list. However, only one container may be expanded (opened) in the gallery pane at any given time. In other words, only information units (files, notes, documents, etc.) from one particular container may be simultaneously viewed within an intuitive matrix, represented by content snippets or file type icons. When a user needs to view items from another container, the user has to navigate within the hierarchy list and expand a new container to replace a previously opened container.

A limitation on displaying folder contents may significantly restricts data access efficiency; unfortunately, the restriction may not be cured by various file tree mapping techniques, such as a slice-and-dice method and other mapping approaches.

Accordingly, it is desirable to develop a two-dimensional information flow for container hierarchies to allow simultaneous access to information units in multiple containers.

SUMMARY OF THE INVENTION

According to the system described herein, presenting items in a two-dimensional access pane includes presenting a first set of icons arranged contiguously and in two dimensions of the access pane, where each of the icons corresponds to an item and at least some of the items are container icons that represent containers that contain other items and expanding at least one of the container icons to show a first container pane having icons corresponding to items contained in a corresponding container, where icons in the first container pane are arranged contiguously and in two dimensions of the first container pane. At least some of the icons in the first container pane may be container icons that represent containers that contain other items. Presenting items in a two-dimensional access pane may also include expanding at least one of the container icons in the first container pane to show a second container pane having icons corresponding to items contained in a corresponding container, where icons in the second container pane are arranged contiguously and in two dimensions of the second container pane. Icons corresponding to unopened containers in the first container pane may be moved below the second container pane. Icons that are moved may be visually distinguished. Items in each of the container panes may be arranged from left to right in the access pane so that one of the items is on a far right side in a particular row of the access pane and a successive one of the items is on a far left side and in a subsequent row of the access pane. Items in each of the container panes may be arranged from right to left in the access pane so that one of the items is on a far left side in a particular row of the access pane and a successive one of the items is on a far right side and in a subsequent row of the access pane. The items may be files in a file system. The file system may be provided in connection with a personal computer that runs one or more of the following operating systems: Macintosh OS, MS Windows, and Linux. The items may be data in a database system. The first container pane may be shifted laterally one position with respect to the corresponding one of the container icons. The second container pane may be shifted laterally one position with respect to the corresponding one of the container icons. At least some of the icons may be thumbnails and/or snippets of corresponding content. The access pane may include a toolbar for manipulating icons. The toolbar may include icons that perform operations such as expand, collapse, cut, copy, paste, magnify, shrink, sort, and/or choose favorites. The access pane may be displayed on a screen of a mobile device. The mobile device may use iOS, Android OS, Windows Phone OS, Blackberry OS or mobile versions of Linux OS.

According further to the system described herein, computer software, provided in a non-transitory computer-readable medium, presents items in a two-dimensional access pane. The software includes executable code that presents a first set of icons arranged contiguously and in two dimensions of the access pane, where each of the icons corresponds to an item and at least some of the items are container icons that represent containers that contain other items and executable code that expands at least one of the container icons to show a first container pane having icons corresponding to items contained in a corresponding container, where icons in the first container pane are arranged contiguously and in two dimensions of the first container pane. At least some of the icons in the first container pane may be container icons that represent containers that contain other items. The software also includes executable code that expands at least one of the container icons in the first container pane to show a second container pane having icons corresponding to items contained in a corresponding container, where icons in the second container pane are arranged contiguously and in two dimensions of the second container pane. Icons corresponding to unopened containers in the first container pane may be moved below the second container pane. Icons that are moved may be visually distinguished. Items in each of the container panes may be arranged from left to right in the access pane so that one of the items is on a far right side in a particular row of the access pane and a successive one of the items is on a far left side and in a subsequent row of the access pane. Items in each of the container panes may be arranged from right to left in the access pane so that one of the items is on a far left side in a particular row of the access pane and a successive one of the items is on a far right side and in a subsequent row of the access pane. The items may be files in a file system. The file system may be provided in connection with a personal computer that runs one or more of the following operating systems: Macintosh OS, MS Windows, and Linux. The items may be data in a database system. The first container pane may be shifted laterally one position with respect to the corresponding one of the container icons. The second container pane may be shifted laterally one position with respect to the corresponding one of the container icons. At least some of the icons may be thumbnails and/or snippets of corresponding content. The access pane may include a toolbar for manipulating icons. The toolbar may include icons that perform operations such as expand, collapse, cut, copy, paste, magnify, shrink, sort, and/or choose favorites. The access pane may be displayed on a screen of a mobile device. The mobile device may use iOS, Android OS, Windows Phone OS, Blackberry OS or mobile versions of Linux OS.

The proposed technique for constructing and displaying a two-dimensional data flow for container hierarchies, such as Evernote notebook and note access system (i.e., data in a database system), file trees and other hierarchical data sets, includes merging a file hierarchy pane and a gallery pane into a single two-dimensional access pane that may display both container icons and information unit snippets (collectively, items) within multiple containers, allowing a user to expand and/or collapse some or all of the containers at any time.

The technique may include two different data flows and views of the access pane: hierarchical and contiguous. With the hierarchical data flow, whenever a container at a certain level of the hierarchy is expanded in the access pane, a level of the container may be indicated by an offset from the left vertical edge of the pane, similarly to the layout within a traditional container hierarchy list. The container icon or thumbnail may be highlighted or altered. For right-to-left languages, the system may be customized by making the offset start at the right vertical edge of the access pane.

For example, an expanded top level container item (Level 1) may occupy the utmost left position in an access pane; immediate sub-containers (Level 2) of the top level container, when expanded, may occupy the second position from the left, etc. It should be noted that, with the hierarchic data flow and display in the access pane, deep container hierarchies may be limited by displaying only a certain number of levels thereof, which may depend on the effective width of the access pane. Thus, if the access pane may only include ten items in each horizontal line due to limitations on screen resolution or user settings (such as extra-large item icons), then a maximum depth of a displayed hierarchy may be limited, for example, to six levels, so that enough space is provided in the access pane to display items of the most detailed level (with the highest level number).

For each expanded container, the system may create a sub-pane for items present in the container, called a container pane, which is shifted by one position to the right of the container icon and occupies the remainder of the access pane. Icons, thumbnails or snippets for all items in the expanded container, including subordinate (embedded) container items, are displayed in the container pane line-by-line in the same way as the whole container hierarchy finds its place in the access pane; the last line of the display may be incomplete.

Every new container located at any level in the container tree and expanded in the access pane, whether at the top level or within another container pane, initiates a new pane offset to the right with respect to the container icon. Items present in a new container may be displayed in the new container pane and occupy a contiguous series of lines.

When a new container at some level is expanded either directly in the access pane or in one of the embedded container panes of the new container, the new container pane occupies some space within the access pane. Information flow for other items at the same level, which are displayed side by side with the new container item when the container is closed, may follow several scenarios. Under one scenario, the items preserve an initial sort order, so the items preceding the newly expanded container remain above a new container pane, while items with sort order succeeding the container drop below the new container pane. Under an alternative scenario, newly expanded container panes gain priority over closed containers and other items at the same level. Consequently, expanded containers in the alternative scenario are moved to the top of the access pane or a container pane of a parent container of the expanded container, while retaining the pre-existing sorting order between the containers at the same level; in connection with this, closed containers and single data units at the same level drop down below all such expanded containers and retain a relative sorting order.

A second technique of data flow includes a contiguous space-saving flow where expanded container panes are not offset against a vertical boundary of the access pane but instead follow each other without space or with a minimal spacing, so that an expanded container at any level may be displayed in an arbitrary position within the access pane, defined by the specifics of data flow and number of items in each container. Such data flow and display may be helpful when a user is visually searching for certain items within a significant information volume without knowing at which hierarchy level the desired items are located. Under such conditions, the user may need maximal information density, while a hierarchic data representation may not be particularly valuable for achieving a goal.

With a contiguous space-saving flow, container panes may be split between different lines of an access pane and may end in a middle position within a certain line, immediately followed by other items, according to the data flow. This may apply to container panes at any hierarchy level. Visual markers may be used to facilitate viewing split container panes by users.

It should be noted that information flow, layout and display for the proposed system are consistent with the container hierarchy: specifically, if a container at a certain level is expanded, then all preceding containers in a path that includes that expanded container (the notion of path is explained elsewhere herein) are also expanded. Similarly, if a container at a certain level is collapsed, so are all containers that are included with the container.

For right-to-left languages, the system may be modified to the contiguous space-saving flow by reversing line direction, so that the last icon in any line of the access pane is located on the left and the subsequent icon is the utmost right icon on the next line.

Any visible container in an access pane may toggle between expanded and collapsed states by a click or touch by a user. Additional operations over the container tree and items in the container tree may also be supported by the system. The additional operations may include expanding or collapsing all items in the container tree, sorting items by different attributes, viewing, hiding and unhiding certain types of data, designating items as favorites and placing or duplicating items within a priority section of the access pane, navigating and editing folders and items, toggling viewing modes for the access pane and items in the access pane, searching, etc.

Additional operations within an access pane may include Expand All, Collapse All, Expand More (for example, expanding each container by one extra level if the container has embedded containers), Collapse More (a reverse action to Expand More), Sort folders or/and items by name, date, data type, size and other parameters, Pin an item as a favorite, Cut/Copy/Paste any item or set of items in the tree, Move items between folders by dragging portions of the tree, View icons and thumbnails in different sizes, etc. The system may also have enhanced navigation features reflecting unique information flow of the system, such as navigating to a next/previous expanded container, simultaneously hiding of all items and displaying only containers, and a reciprocal operation of hiding all containers to view only items. Operations within an access pane may be assigned to buttons, menus, keyboard keys and shortcuts, multi-touch gestures, etc.

It should be noted that the system may take into account screen resolution and size, object size in an access pane, depth of a container tree, overall number of items and other factors to optimize information display in the access pane. For example, the system may pre-scan the container tree and automatically choose an optimal initial object size, number of objects per line, and number of displayed levels.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for organizing, rendering and viewing hierarchical container trees with information units at different levels within a two-dimensional access pane for convenient processing by users. Multiple information flow options available within the system serve different information access tasks.

Figure 1:
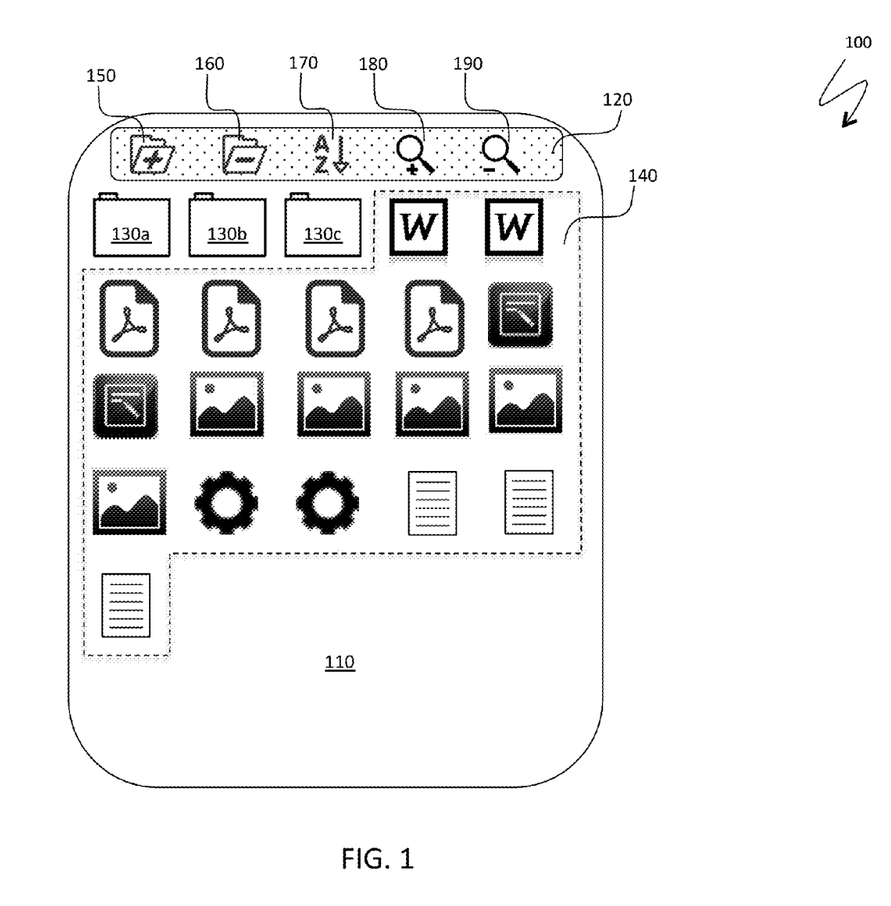
FIG. 1 is a schematic illustration of an access pane with collapsed containers, according to embodiments of the system described herein.

FIG. 1 is a schematic illustration 100 of an access pane 110 with collapsed containers. The access pane 110 has a toolbar 120 and displays a container tree with three collapsed containers 130a-130c and items 140 (information units) of different types, as represented by icons. Icons or buttons of the toolbar 120 illustrate sample display, data flow and processing features of the system that are explained elsewhere herein. Thus, two icons 150, 160 represent two reciprocal data flow features of expanded and collapsing a container tree by one additional level; an icon 170 represents a data processing feature of sorting containers and items by a certain attribute, such as name; two icons 180, 190 show reciprocal visualization features of zooming in and zooming out that may cause, for example, increase and decrease of an icon size within the access pane 110.

Figure 2:
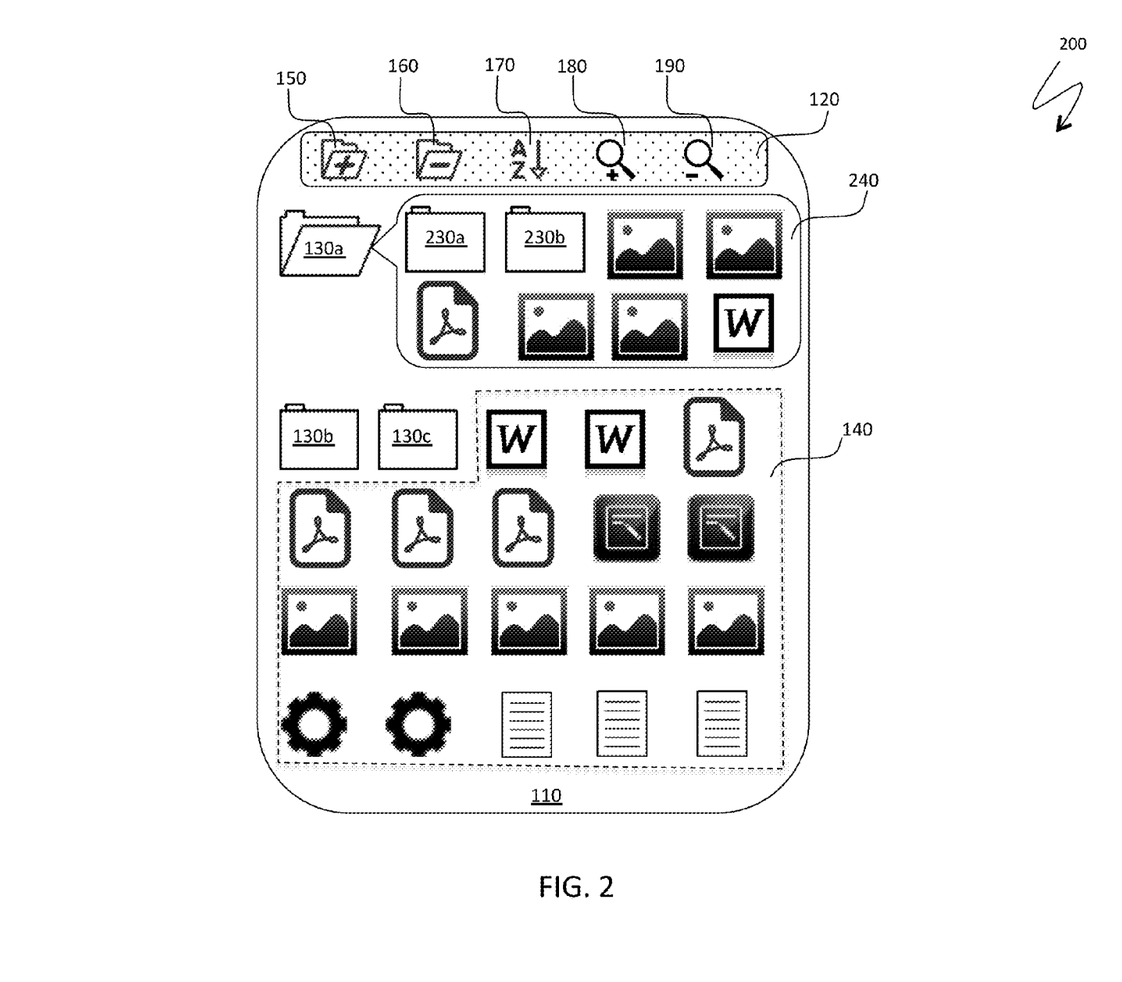
FIG. 2 schematically illustrates data flow and visualization for an access pane with one expanded top level container, according to embodiments of the system described herein.

FIG. 2 is a schematic illustration 200 of data flow and visualization for the access pane 110 with the top level container 130a expanded. In FIG. 2, a hierarchical data flow is used. The access pane 110 displays the same container tree as in FIG. 1, except that the container 130a is expanded to create a container pane 240 and display subordinate containers and items within the container pane. The container pane 240 shows two second level containers 230a, 230b and several items belonging to the container 130a. According to the hierarchical data flow explained elsewhere herein, the container pane 240 is placed next to the container icon 130a, with a single position offset in the access pane 110 and occupying several reserved lines in the access pane. Remaining items 130b, 130c, 140 in the container tree retain an original flow thereof and are placed starting from the next line of the access pane 110 located below the container pane 240.

Figure 3:
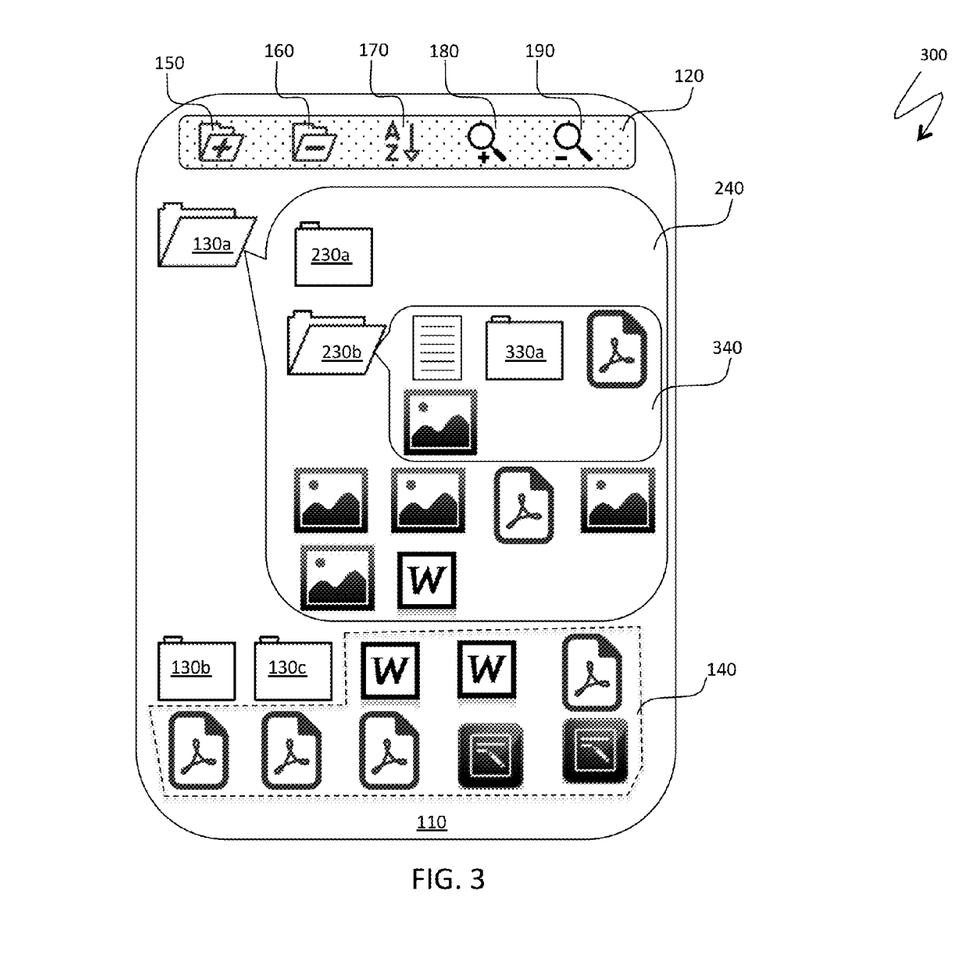
FIG. 3 is a schematic illustration of an access pane with expanded containers at two levels and a hierarchical data flow, according to embodiments of the system described herein.

FIG. 3 is a schematic illustration 300 of an access pane with expanded containers at two different levels and a hierarchical data flow. The access pane 110 further expands the folder tree illustrated in FIG. 1 and FIG. 2; specifically, the previously expanded first level container 130a with the corresponding container pane 240 includes the collapsed container 230a and now an expanded version of the container 230b. Expanding the container 230b opens an embedded container pane 340, positions the embedded container pane 340 with an additional offset, and displays its items within the embedded container pane 340. Remaining items in the previously expanded container 130a and the items 140 are displayed in a same order as previously.

Figure 4:
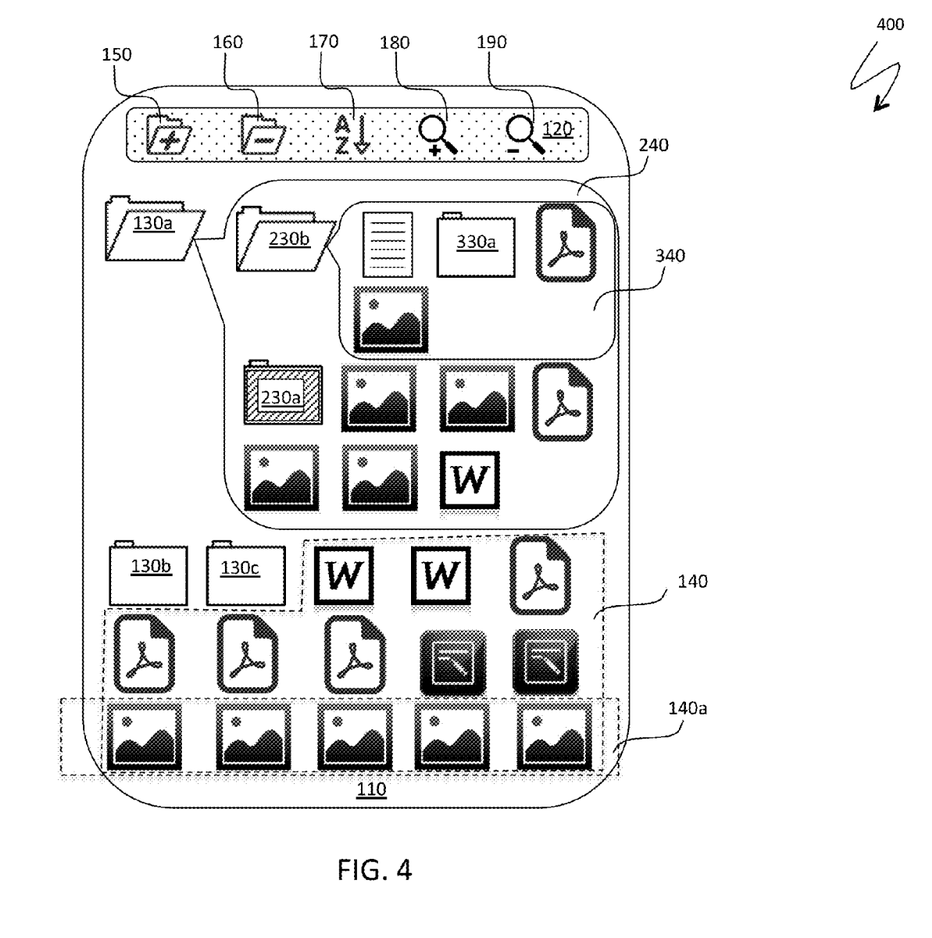
FIG. 4 is a schematic illustration of an access pane with a prioritized information flow for expanded containers, according to embodiments of the system described herein.

FIG. 4 is a schematic illustration 400 of the access pane 110 with a prioritized information flow for expanded containers. As explained elsewhere herein, when a user expands one or more containers, it may be interpreted as evidence that the user prioritizes contents of a recently expanded container over collapsed containers and wants to see the expanded container in a more prominent position. Accordingly, an alternative data flow puts expanded containers above adjacent closed containers at the same level of hierarchy in a container tree. The access pane 110 shows the expanded first level container 130a with the container pane 240, and the expanded subordinate container 230b with the container pane 340 show the same semi-expanded state of the container tree common to FIG. 1, FIG. 2, and FIG. 3 as shown in FIG. 3. However, a data flow in FIG. 4 is different from FIG. 3: the container 230a, which is placed in FIG. 3 above the expanded container 230b and the corresponding container pane 340, following an original order in the container tree, is now altered to support prioritized information flow for expanded containers. Accordingly, the container 230a is moved below the container pane 340 and joins items in the container pane 240. In order to indicate to a user that a change in order has occurred, display icons for moved items may be visually distinguished, as illustrated by shape filling pattern on the container icon 230a. The remaining containers 130b, 130c and items 140 are displayed with an unchanged information flow. In many cases, a prioritized information flow may result in a more compact display than a regular hierarchical flow; this is demonstrated in FIG. 4 where an extra line 140a of image files is present, which was absent in FIG. 3 in spite of the same state of the container tree.

Figure 5:
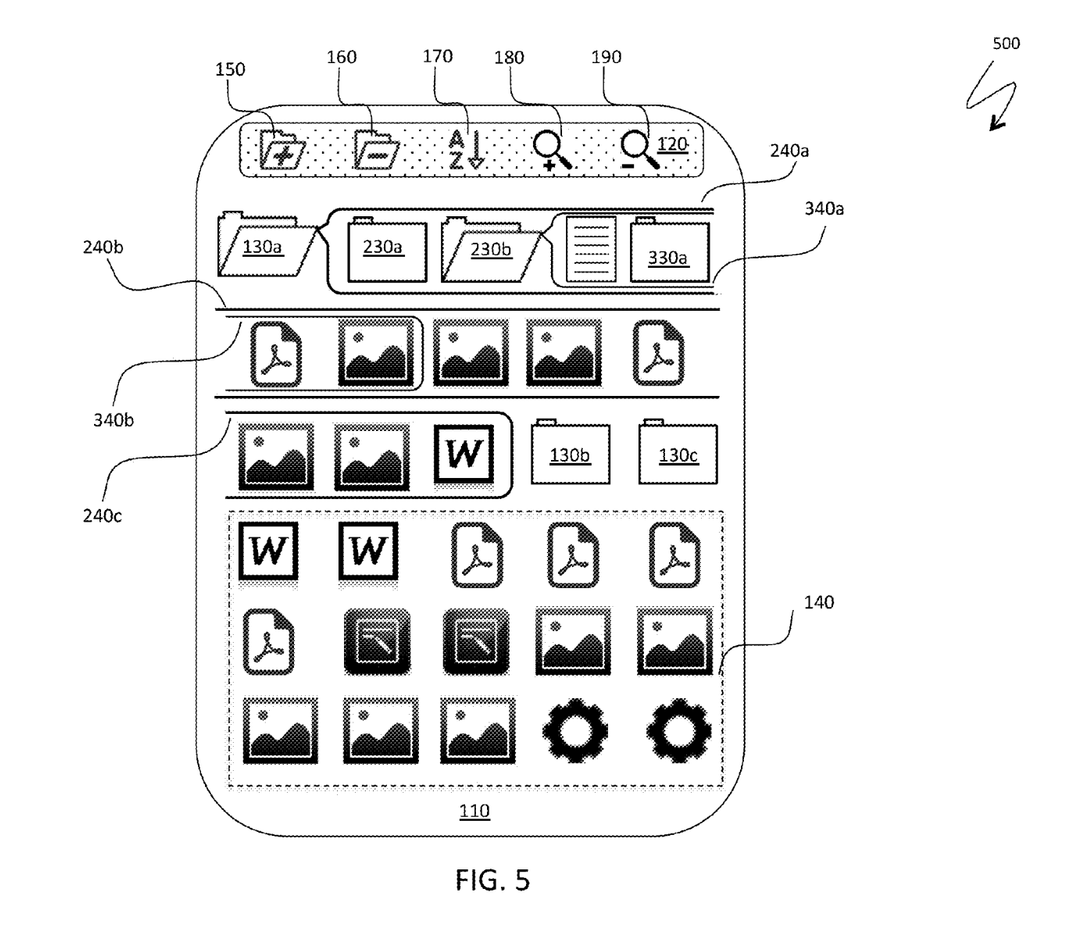
FIG. 5 is a schematic illustration of an access pane with a contiguous space-saving information flow, according to embodiments of the system described herein.

FIG. 5 is a schematic illustration 500 of the access pane 110 with a contiguous space-saving information flow. In contrast with the information flow in FIGS. 3, 4, containers and items in FIG. 5 form one contiguous range of items split without spaces and offsets between multiple lines of the access pane 110. Specifically, an icon of a first level container 130a is located in the utmost left position of the first content line of the access pane. The first level container 130a is immediately followed by a container pane with a first portion 240a located in the same line as the container icon 130a. The container pane has a middle portion 240b covering a full line of the access pane and an end portion 240c covering three items from the start to the middle of the third line of the access pane 110. Similarly, the expanded second level container 230b (a sub-container of the first level container 130a) is represented by a container pane with the starting portion 340a located in the same line of the access pane with both container icons 230a, 230b, while the end portion 340b takes a portion of the next line. Other items 130b, 130c, 140 are placed at the end of the access pane 110 in a same way as in previous figures. It should be noted that the contiguous space-saving information flow achieves maximum information density with a given screen and access pane sizes, screen resolution and a default or user defined size of content icons. Thus, FIG. 5 displays 30 information units (container and item icons) compared with 23 units in FIG. 3, a 30% increase in information density.

Figure 6:
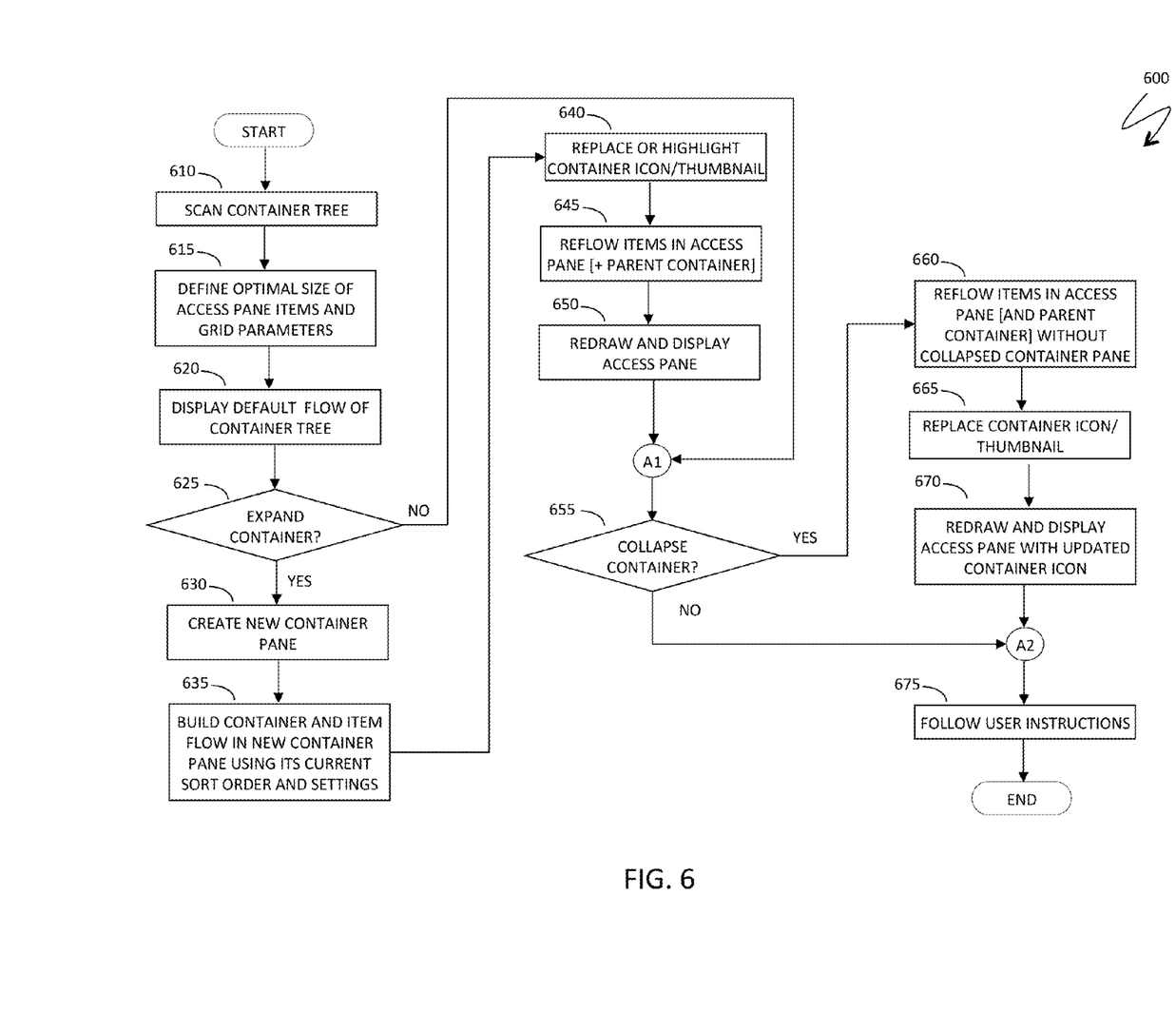
FIG. 6 is a system flow diagram illustrating operation of the system, according to embodiments of the system described herein.

Referring to FIG. 6, a flow diagram 600 illustrates in detail changes in information workflow and display within an access pane associated with expanding and collapsing containers. Processing starts at a step 610 where the system scans a container tree or other data structure displayed and processed in the access pane. After the step 610, processing proceeds to a step 615, where the system calculates optimal size of access pane items and grid parameters (the number and width of lines of the access pane). After the step 615, processing proceeds to a step 620, where a default flow of the container tree (or other data structure) is displayed in the access pane.

After the step 620, processing proceeds to a test step 625, where it is determined whether a user is expanding a previously collapsed container. If so, processing proceeds to a step 630, where a new container pane is created. After the step 630, processing proceeds to a step 635, where a container and item flow in the new container pane is built using current sort order and other settings defined by the system and/or user. After the step 635, processing proceeds to a step 640, where the container icon may be replaced or highlighted prior to its display. For example, in FIGS. 1-5, icons of expanded containers are represented by images of semi-opened folders, while collapsed containers are associated with images of closed folders. Another example is shown in FIG. 4 where an icon of a collapsed container is highlighted to show a change in a display order due to prioritized information flow for expanded containers. After the step 640, processing proceeds to a step 645, where an information flow for containers and items in the access pane and possibly in a parent container of the currently expanded container is modified (information reflow). After the step 645, processing proceeds to a step 650, where the access pane with the modified data flow is redrawn and displayed to the user.

After the step 650, processing proceeds to a test step 655, which also follows the test step 625 in case when a user does not want to expand a currently collapsed container. At the test step 655, it is determined whether the user is collapsing a previously expanded container. If so, processing proceeds to a step 660, where an information flow in the access pane and possibly in a parent container of the currently collapsed container is modified and a container pane of the currently collapsed container is deleted, as explained elsewhere herein. After the step 660, processing proceeds to a step 665, where a container icon or thumbnail is modified, which is explained elsewhere herein. After the step 665, processing proceeds to a step 670, where the system redraws and displays a modified access pane with an updated container icon to the user.

After the step 670, processing proceeds to a step 675, where the system follows user instructions on information workflow, sorting and other processing, changing system settings, etc. The step 675 may also be reached from the test step 655 in case when the user does not want to collapse a currently expanded container. After the step 675, processing is complete. It should be noted that, although simultaneous expanding and collapsing of multiple containers, such as when a user presses a button 150, 160 (presented, for example, in FIG. 1) to expand or collapse all containers by one additional level, are not explicitly explained in the diagram 600, the sequence of steps for such operations is substantially similar to the steps presented in FIG. 6.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a smartphone, although other devices, such as wearable computers, are also possible. The system described herein may be implemented with any type of electronic screen capable of being actuated by a touch screen, electromagnetic or other pen.

Note that mobile device(s) capable of running the system described herein may include software that is pre-loaded with the device, installed from an app store, installed from a desktop (after possibly being pre-loaded thereon), installed from media such as a CD, DVD, etc., and/or downloaded from a Web site. The mobile device may use an operating system such as iOS, Android OS, Windows Phone OS, Blackberry OS and mobile versions of Linux OS.

Software implementations of the system described herein may include executable code that is stored in a computer readable medium and executed by one or more processors, including one or more processors of a personal computer (desktop computer or laptop computer). The personal computer may receive input from a capturing device that may be connected to, part of, or otherwise in communication with the personal computer. The personal computer may include software that is pre-loaded with the device, installed from an app store, installed from media such as a CD, DVD, etc., and/or downloaded from a Web site. The personal computer may run one or more operating systems including Macintosh OS, MS Windows, and Linux. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of presenting items in a two-dimensional access pane, comprising:
   presenting a first set of icons arranged contiguously and in two dimensions of the access pane, wherein each of the icons corresponds to an item and at least some of the items are container icons that represent containers that contain other items;
   expanding at least one of the container icons to show a first container pane having icons corresponding to items contained in a corresponding container, wherein icons in the first container pane are arranged contiguously and in two dimensions of the first container pane; and
   expanding at least one of the container icons in the first container pane to show a second container pane having icons corresponding to items contained in a corresponding container, wherein icons in the second container pane are arranged contiguously and in two dimensions of the second container pane and wherein icons in the first container pane are prioritized by moving icons corresponding to unopened containers to reorder icons in the first container pane.

2. A method, according to claim 1, wherein icons corresponding to unopened containers in the first container pane are moved below the second container pane.

3. A method, according to claim 1, wherein icons that are moved are visually distinguished.

4. A method, according to claim 1, wherein items in each of the container panes are arranged from left to right in the access pane so that one of the items is on a far right side in a particular row of the access pane and a successive one of the items is on a far left side and in a subsequent row of the access pane.

5. A method, according to claim 1, wherein items in each of the container panes are arranged from right to left in the access pane so that one of the items is on a far left side in a particular row of the access pane and a successive one of the items is on a far right side and in a subsequent row of the access pane.

6. A method, according to claim 1, wherein the items are files in a file system.

7. A method, according to claim 1, wherein the items are data in a database system.

8. A method, according to claim 1, wherein the first container pane is shifted laterally one position with respect to the corresponding one of the container icons.

9. A method, according to claim 8, wherein the second container pane is shifted laterally one position with respect to the corresponding one of the container icons.

10. A method, according to claim 1, wherein at least some of the icons are at least one of: thumbnails and snippets of corresponding content.

11. A method, according to claim 1, wherein the access pane includes a toolbar for manipulating icons.

12. A method, according to claim 11, wherein the toolbar includes icons that perform at least some of the following operations: expand, collapse, cut, copy, paste, magnify, shrink, sort, and choose favorites.

13. A method, according to claim 1, wherein the access pane is displayed on a screen of a mobile device.

14. A non-transitory computer-readable medium containing software that presents items in a two-dimensional access pane, the software comprising:

executable code that presents a first set of icons arranged contiguously and in two dimensions of the access pane, wherein each of the icons corresponds to an item and at least some of the items are container icons that represent containers that contain other items;

executable code that expands at least one of the container icons to show a first container pane having icons corresponding to items contained in a corresponding container, wherein icons in the first container pane are arranged contiguously and in two dimensions of the first container pane; and executable code that expands at least one of the container icons in the first container pane to show a second container pane having icons corresponding to items contained in a corresponding container, wherein icons in the second container pane are arranged contiguously and in two dimensions of the second container pane and wherein icons in the first container pane are prioritized by moving icons corresponding to unopened containers to reorder icons in the first container pane.

15. A non-transitory computer-readable medium, according to claim 14, wherein icons corresponding to unopened containers in the first container pane are moved below the second container pane.

16. A non-transitory computer-readable medium, according to claim 14, wherein icons that are moved are visually distinguished.

17. A non-transitory computer-readable medium, according to claim 14, wherein items in each of the container panes are arranged from left to right in the access pane so that one of the items is on a far right side in a particular row of the access pane and a successive one of the items is on a far left side and in a subsequent row of the access pane.

18. A non-transitory computer-readable medium, according to claim 14, wherein items in each of the container panes are arranged from right to left in the access pane so that one of the items is on a far left side in a particular row of the access pane and a successive one of the items is on a far right side and in a subsequent row of the access pane.

19. A non-transitory computer-readable medium, according to claim 14, wherein the items are files in a file system.

20. A non-transitory computer-readable medium, according to claim 14, wherein the items are data in a database system.

21. A non-transitory computer-readable medium, according to claim 14, wherein the first container pane is shifted laterally one position with respect to the corresponding one of the container icons.

22. A non-transitory computer-readable medium, according to claim 21, wherein the second container pane is shifted laterally one position with respect to the corresponding one of the container icons.

23. A non-transitory computer-readable medium, according to claim 14, wherein at least some of the icons are at least one of: thumbnails and snippets of corresponding content.

24. A non-transitory computer-readable medium, according to claim 14, wherein the access pane includes a toolbar for manipulating icons.

25. A non-transitory computer-readable medium, according to claim 24, wherein the toolbar includes icons that perform at least some of the following operations: expand, collapse, cut, copy, paste, magnify, shrink, sort, and choose favorites.

26. A non-transitory computer-readable medium, according to claim 14, wherein the access pane is displayed on a screen of a mobile device.

* * * * *